United States Patent Office 3,240,941
Patented Mar. 15, 1966

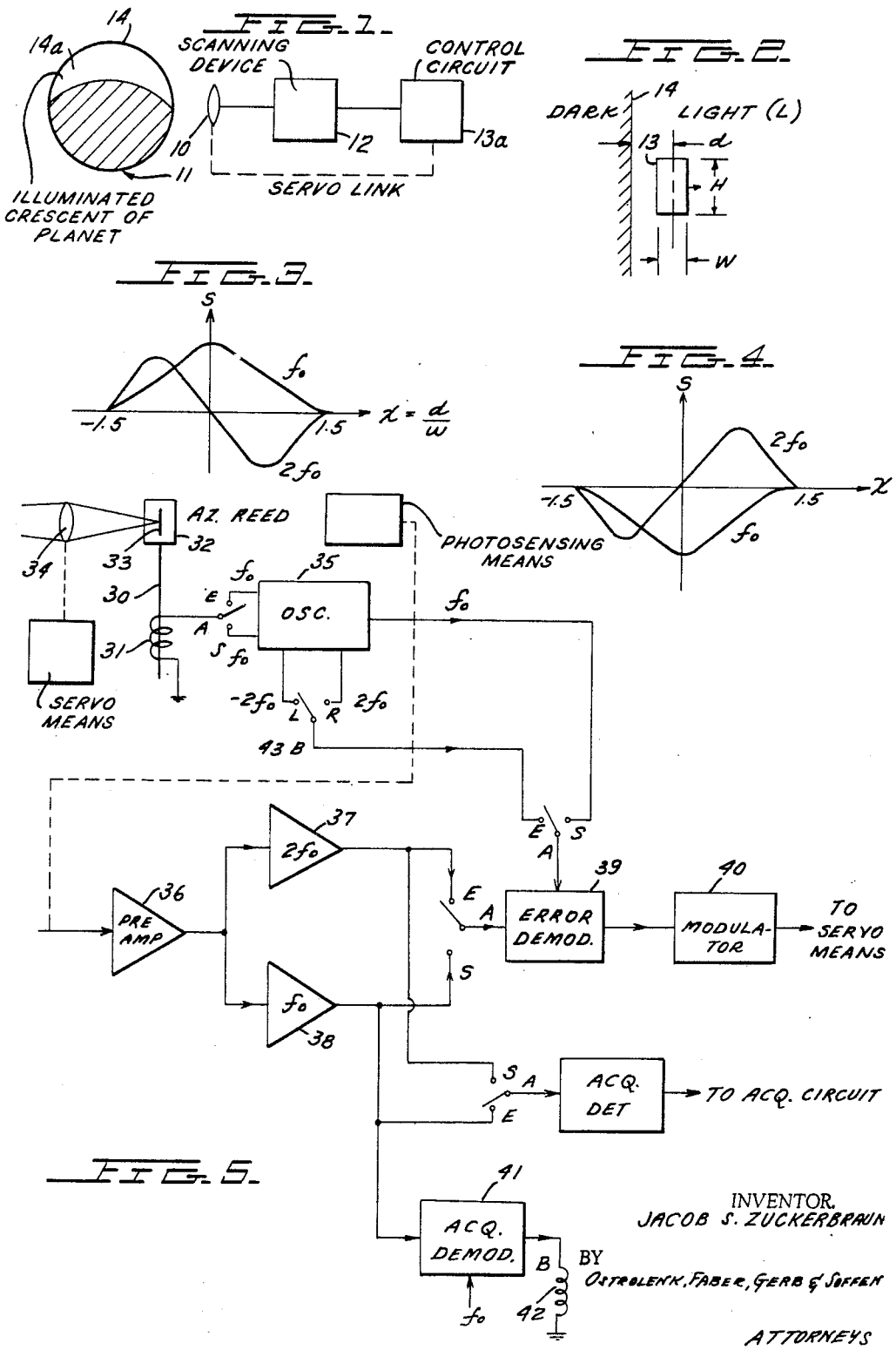

3,240,941
PHOTOSENSITIVE HORIZON TRACKER USING A REED SCANNER CONVERTIBLE TO STAR TRACKING
Jacob S. Zuckerbraun, New York, N.Y., assignor to Kollsman Instrument Corporation, Elmhurst, N.Y., a corporation of New York
Filed Dec. 11, 1961, Ser. No. 158,427
2 Claims. (Cl. 250—203)

This invention relates to an automatic device for tracking the position of the horizon or the edge of a planet from a satellite or from a solar vehicle wherein the scanning mechanism is of the reed-type which oscillates an aperture to modulate the image of the light coming from the horizon.

Reed-type scanners are well known for tracking remote point sources of light such as stars or planets. Devices of this type are set forth in my copending application Serial No. 47,837, filed August 8, 1960, entitled, "Light Modulation System," and assigned to the assignee of the present invention.

I have found that the reed-type scanner may be adapted for use with tracking the edge of a planet, whereby the device may be used as a horizon scanner or, with appropriate switching circuitry, to change the mode of operation as a device for tracking a star.

When the edge of a light area such as the edge of a planet is to be tracked, correction signals must be developed according to whether the edge lies to the left or the right of the center line of oscillation of the scanning mechanism, independently of whether the illuminated area is to the left or the right of the edge.

I have found that the scanning mechanisms previously proposed, as in my above noted application Serial No. 47,837, can be utilized since there will be a phase reversal in the fundamental and second harmonic of the modulated light, depending upon whether the center line of the scanning mechanism is to the right or the left of the illuminated area. Moreover, if the edge moves from one side of the center of oscillation to the other, only the 2nd harmonic reverses phase. If the light and dark areas are interchanged then both fundamental and 2nd harmonic reverse in phase.

With this recognition, I can thereby provide appropriate circuitry whereby the telescope of the mechanism can be continually aimed at the immediate edge of the planet or other illuminated large area with correction in aiming being made in response to phase reversal of the modulated output light.

Moreover, and once the coordinates of three points along the edge are determined, a computer can easily solve for the coordinates of the center of the disk, as has been disclosed in my copending application Serial No. 158,300 entitled, "Horizon Scanner," and assigned to the assignee of the present invention.

Accordingly, the primary object of this invention is to provide a novel horizon tracker.

Another object of this invention is to provide a novel horizon tracker which can be used either to track the edge of a planet or to track a remote point source of light such as a star.

Another object of this invention is to utilize the phase reversal of the second harmonic of the modulated light from the edge of a planet when the edge of the planet passes from one side to the other of the center of vibration of an oscillating aperture.

These and other objects of this invention will become apparent from the following description when taken in connection with the drawings, in which:

FIGURE 1 schematically illustrates a block diagram of the system of the invention.

FIGURE 2 illustrates the aperture of an aperture-type scanner with respect to a boundary between dark and light of the image of the edge of a planet.

FIGURE 3 illustrates the fundamental and second harmonic outputs of a light sensitive device receiving the scanned light from a planet image as a function of the position of the edge of a planet with respect to the center line of a reed scanner.

FIGURE 4 illustrates the phase reversal of the fundamental and second harmonic of FIGURE 3 when light and dark areas are interchanged.

FIGURE 5 is a block diagram of the control circuitry for a light tracker constructed in accordance with the invention.

Referring first to FIGURE 1, I have illustrated therein a schematically illustrated start tracking device which can be identical to that shown in copending application Serial No. 47,837 which would include a telescope system shown as lens 10 which can view a planet 11 and project the image of planet 11 or a portion thereof on photo-sensing means and scanning means 12.

The scanning means 12 could, for example, include a vibrating aperture located in the focal plane of lens system 10 so that the image is modulated by a vibrating aperture.

The light passing through the aperture and modulated thereby is then impinged upon a photo-sensing means which develops appropriate output signals.

The vibrating aperture is schematically illustrated in FIGURE 2 as the aperture 13 which has a width W, a height H and oscillates in a horizontal direction.

In FIGURE 2, the image upon which the slot operates is the edge 14 of planet 11 which is at the upper half of planet 11 of FIGURE 1, and is part of the upper half of the illuminated crescent 14a. The left-hand side of edge 14 of FIGURE 2 is the dark space behind the planet 11.

In FIGURE 2, the center of oscillation of aperture 13 is a distanced from the edge 14 which is a boundary going from darkness to light.

Analysis of the signals developed by the vibrating aperture of FIGURE 2 when scanning an edge yields the following equations for the fundamental and second harmonic of the signal.

The fundamental is given by:

$$S_1 = K_1[(\tfrac{1}{2}-|x|)\sqrt{1-(\tfrac{1}{2}-|x|)^2} + \sin^{-1}(\tfrac{1}{2}-|x|) + \pi/2]$$

for the ranges $$-\tfrac{3}{2} \leq x \leq -\tfrac{1}{2};\ \tfrac{1}{2} \leq x \leq \tfrac{3}{2} - \pi/2 \leq \sin^{-1}(\tfrac{1}{2}-|x|) \leq \pi/2$$

$$S_1 = K_1[(x+\tfrac{1}{2})\sqrt{1-(x+\tfrac{1}{2})^2} + \sin^{-1}(x+\tfrac{1}{2})$$
$$- (x-\tfrac{1}{2})\sqrt{1-(x-\tfrac{1}{2})^2} - \sin^{-1}(x-\tfrac{1}{2})]$$

in the range $-\tfrac{1}{2} \leq x \leq \tfrac{1}{2}$

The second harmonic is given by $$S_2 = +K_2\sqrt{[1-(x+\tfrac{1}{2})^2]^3}$$

in the range $-\tfrac{3}{2} \leq x \leq -\tfrac{1}{2}$ $$S_2 = K_2(-\sqrt{[1-(x-\tfrac{1}{2})^2]^3} + \sqrt{[1-(x+\tfrac{1}{2})^2]^3}$$

in the range $-\tfrac{1}{2} \leq x \leq \tfrac{1}{2}$ $$S_2 = -K_2\sqrt{[1-(x-\tfrac{1}{2})^2]^3}$$

in the range $\tfrac{1}{2} \leq x \leq \tfrac{3}{2}$ where $$K_1 = \frac{LWH}{\pi}$$

$$K_2 = \frac{2LWH}{3\pi}$$

$L$=brightness of illuminated area in lumens/ft.$^2$
$W$=width of aperture in direction of vibration
$H$=length of aperture
$x$=displacement of edge with respect to center of oscillation normalized to $W$.

The general form of the fundamental and second harmonic are shown in FIGURE 3.

$S_1$, therefore, can be used for recognition and $S_2$ for servo positioning.

If the dark area lies to the right of edge 14, then both signals reverse in phase, as shown in FIGURE 4.

The recognition signal may, therefore, be used to determine not only the presence of an edge, but also whether the dark area is to the left or right of the light area.

In order to maintain the telescope or lens system 10 directed toward the edge 14, it is, therefore, possible, since phase reversal of the output signals, as indicated in FIGURES 3 and 4, will indicate a relative position of edge 14, to provide appropriate control circuitry 13a which may be servoed back to the telescope 10.

FIGURE 5 illustrates in block diagram the manner in which the system can be used for either edge tracking or point source tracking.

When operating in this star tracking mode, all switches labeled E on one side and S on the other are connected in their S or star mode position.

When operating in the normal point source tracking mode, the operation will be identical to that of my above noted application Serial No. 47,837. More specifically, I have schematically illustrated in FIGURE 5 a scanning reed 30 having an electromagnetic drive 31 which causes the reed 30 and the aperture plate 32 having an aperture 33 therein to oscillate. The reed 30 is noted in FIGURE 5 as an azimuth reed whereby the system of FIGURE 5 operates to develop azimuth information. Clearly, a similar system is also provided to develop altitude information. The image of a star which is to be tracked is focused in the plane which includes aperture 33, as illustrated by condensing lens system 34.

A photo-sensing means (not shown) is then contained behind aperture 33 to develop electrical output signals which vary in accordance with the modulated light due to the oscillation of slit 33 in front of the image of the star being tracked.

The coil 31 receives appropriate energization from the self-excited reference 35 which could be any type of oscillator which causes reed 30 to oscillate at a frequency $f_0$ with an excursion adapted for star mode tracking.

The output signals from a phototube or similar photo-sensing device positioned behind aperture 33 are then applied to a pre-amplifier stage 36 which is, in turn, connected to two channels which include amplifiers 37 and 38. Channel 37 passes only the second harmonic frequency $2f_0$ of the input signal which, when at a maximum, identifies a null position for the star being tracked. That is to say, when the star image is exactly at the center position of oscillation of aperture 33, the light from lens 34 will be modulated at twice the frequency of vibration of reed 30.

When, however, the star image is off this null position, a fundamental component will be developed, the phase of which depends upon the sense of the deviation from null. The output of channel 38 is then connected to an error demodulator 39, a modulator 40, and thence to a servo amplifier which, in turn, adjusts the position of the telescope in an attempt to maximize the signal in channel 37 to retain the null position.

The signal in channel 37 is then connected to an acquisition detector in which recognition signals are developed to indicate the presence of a star. In star tracking, $f_0$ serves to give position information and $2f_0$ gives recognition and $2f_0$ is a maximum at null. In edge tracking, the $2f_0$ signal serves to give position information while the $f_0$ signal is used for recognition, particularly at null.

In order to now operate the device as an edge scanning device, the edge mode of operation is achieved by placing all switches labeled E and S in the E position for edge mode of operation. Thus, the self-excited reference 35 will now develop signals which increase the excursion of aperture 33 for the edge scanning mode of operation. The output signals developed in the photo-sensitive element behind aperture 33 are then developed, as indicated in FIGURES 3 and 4, depending upon whether the null position of the aperture is to the right or left of boundary 14 of FIGURE 2.

When the dark area is to the right of boundary 14, the presence of signal develops a negative polarity in acquisition demodulator 41. This causes the energization of coil 42 which operates contact 43b. The contact 43 connects self-excited reference 35 to error demodulator 39. The operation of switch 43b from its L position to its R position causes the reference signal to the error demodulator to reverse. The output of the error demodulator, therefore, becomes of the form shown in FIGURE 3 so that the telescope will not "track-off" when there is this type of phase reversal. Thus, the recognition signal which is the signal passing through channel 38 serves as a check on the computer, since it is theoretically known, when pointing, whether the light area should be to the right or the left of the dark region. This will insure that the outer arc of the crescent of planet 11 in FIGURE 1 is tracked rather than the inner arc.

In the above, it has been assumed that the edge being tracked is perpendicular to the direction of aperture vibration. When the edge is inclined at some other angle, the same signals will be developed as previously, except that they will be reduced in amplitude. If the edge runs parallel to the direction of vibration, it is clear that the signals will be reduced to zero. However, by providing two perpendicular scanning mechanisms, as described in copending application Serial No. 47,837, each for a separate axis, the system will track the desired edge, regardless of its orientation in the tracking field.

Although this invention has been described with respect to its preferred embodiments it should be understood that many variations and modifications will now be obvious to those skilled in the art, and it is preferred, therefore, that the scope of this invention be milited not by the specific disclosure herein but only by the appended claims.

What is claimed is:

1. A horizon scanner comprising objective means for focusing the image of a horizon in a focal plane; means for scanning the image of said horizon including an oscillating plate and means for moving said plate with simple harmonic motion positioned in said focal plane and having an aperture therein, and photosensing means positioned behind said aperture and receiving the light of said image after modulation by said scanning means; said photosensing means being connected to an output circuit; said output circuit including circuit element means for ascertaining the position of the edge of said horizon with respect to the center of oscillation of said scanning means; said circuit element means being responsive to a first harmonic component of the output of said output circuit and a second harmonic component of the output of said output circuit; said second harmonic component having twice the frequency of said first harmonic component and indicating that the edge of the horizon is to one side of said center of oscillation of said scanning means; said first harmonic component indicating whether the light area is to the left or right of the dark area; and servo means connected to said circuit element means and connected to said objective means; said servo means retaining said objective means aimed at said horizon.

2. The horizon scanner as set forth in claim 1 which further includes switching means for switching said horizon scanner to a star tracking mode of operation; said switching means reversing the connection of said first harmonic component and said second harmonic component to said circuit element means whereby said second harmonic component operates as a star presence signal and said first harmonic component operates as a deviation signal of a star being tracked from a predetermined position with respect to said scanner.

References Cited by the Examiner

UNITED STATES PATENTS

| | | | |
|---|---|---|---|
| 2,489,305 | 11/1949 | McLennan | 250—202 |
| 2,923,202 | 2/1960 | Trimble | 250—203 X |
| 2,965,762 | 12/1960 | Turck | 250—203 |
| 3,015,730 | 1/1962 | Johnson | 250—202 |
| 3,017,552 | 1/1962 | Brouwer | 250—202 X |
| 3,020,407 | 2/1962 | Merlen | 250—83.3 |

RALPH G. NILSON, *Primary Examiner.*

WALTER STOLWEIN, *Examiner.*